(12) United States Patent
Yamada et al.

(10) Patent No.: US 10,710,552 B2
(45) Date of Patent: Jul. 14, 2020

(54) SMART KEYLESS ENTRY SYSTEM

(71) Applicant: ALPS ALPINE CO., LTD., Tokyo (JP)

(72) Inventors: Yukimitsu Yamada, Miyagi (JP); Daisuke Takai, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/281,488

(22) Filed: Feb. 21, 2019

(65) Prior Publication Data
US 2019/0176757 A1   Jun. 13, 2019

Related U.S. Application Data

(63) Continuation of application No. PCT/JP2017/008461, filed on Mar. 3, 2017.

(30) Foreign Application Priority Data

Sep. 15, 2016 (JP) .................................. 2016-180806

(51) Int. Cl.
*B60R 25/24* (2013.01)
*B60R 25/30* (2013.01)
(Continued)

(52) U.S. Cl.
CPC .............. *B60R 25/24* (2013.01); *B60R 25/30* (2013.01); *E05B 49/00* (2013.01); *B60R 2325/205* (2013.01); *E05B 81/54* (2013.01)

(58) Field of Classification Search
CPC ... B60R 25/24; B60R 25/30; B60R 2325/205; E05B 49/00; E05B 81/54; G07C 2209/63;
(Continued)

(56) References Cited

U.S. PATENT DOCUMENTS

2002/0081987 A1* 6/2002 Yoshida ............... H04B 1/0003
455/277.1
2007/0273553 A1* 11/2007 Albrecht ................ B60R 25/20
340/932.2
(Continued)

FOREIGN PATENT DOCUMENTS

JP         2009-044712         2/2009
JP         2011-085524         4/2011
(Continued)

OTHER PUBLICATIONS

International Search Report dated May 23, 2017 in PCT/JP2017/008461 filed on Mar. 3, 2017.

*Primary Examiner* — Edwin C Holloway, III
(74) *Attorney, Agent, or Firm* — IPUSA, PLLC

(57) ABSTRACT

A smart keyless entry system having an on-vehicle apparatus installed in a vehicle and a portable device configured to communicate with the on-vehicle apparatus includes a location calculating unit configured to calculate a location of the portable device through communication between the on-vehicle apparatus and the portable device, and a vertical-position calculating unit configured to calculate a vertical position of the portable device, wherein the on-vehicle apparatus and the portable device communicate with each other under conditions adjusted in response to the calculated vertical position of the portable device, and wherein control is performed based on the calculated location of the portable device.

7 Claims, 3 Drawing Sheets

(51) Int. Cl.
*E05B 49/00* (2006.01)
*E05B 81/54* (2014.01)

(58) Field of Classification Search
CPC ...... G07C 2209/64; G07C 2009/00555; G07C 2009/00793
USPC .............................................. 340/5.61, 5.72
See application file for complete search history.

(56) References Cited

U.S. PATENT DOCUMENTS

| | | | |
|---|---|---|---|
| 2010/0026503 A1* | 2/2010 | Proefke | G01C 5/06 |
| | | | 340/601 |
| 2013/0069760 A1* | 3/2013 | Lickfelt | H04B 17/29 |
| | | | 340/5.61 |
| 2014/0285319 A1* | 9/2014 | Khan | G07C 9/00309 |
| | | | 340/5.61 |
| 2017/0092127 A1 | 3/2017 | Nakaya | |
| 2017/0249791 A1* | 8/2017 | Woo | G07C 9/00111 |

FOREIGN PATENT DOCUMENTS

| | | |
|---|---|---|
| JP | 2011-208449 | 10/2011 |
| JP | 2014-202705 | 10/2014 |
| JP | 2014-218176 | 11/2014 |

* cited by examiner

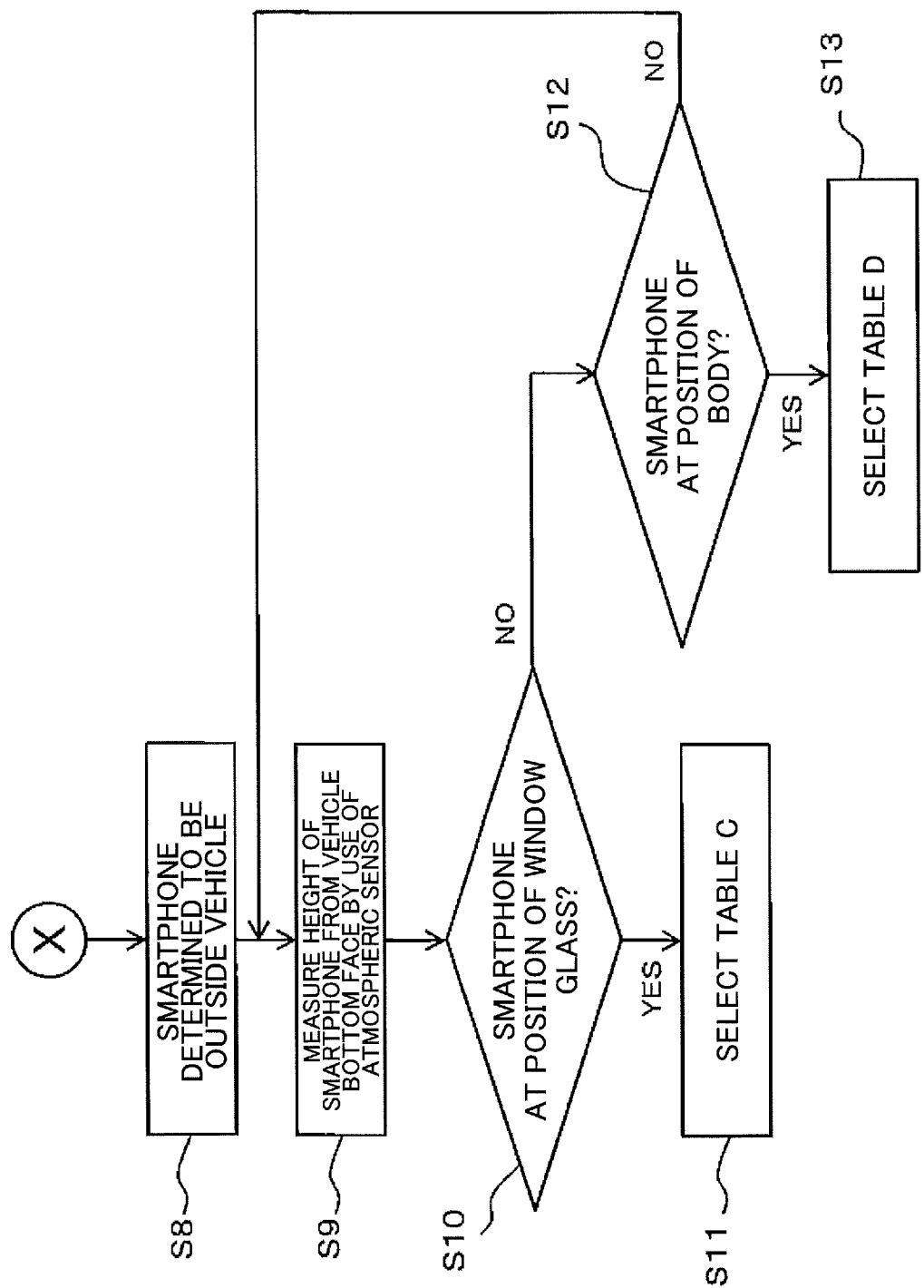

SMART KEYLESS ENTRY SYSTEM

CROSS-REFERENCE TO RELATED APPLICATIONS

This application is a continuation of International Application PCT/JP2017/008461, filed on Mar. 3, 2017 and designated the U.S., which is based on and claims priority to Japanese patent application No. 2016-180806 filed on Sep. 15, 2016, with the Japanese Patent Office. The entire contents of these applications are incorporated herein by reference.

BACKGROUND OF THE INVENTION

1. Field of the Invention

The disclosures herein relate to a smart keyless entry system for controlling a vehicle based on the location of a portable device.

2. Description of the Related Art

In the smart keyless entry system disclosed in Patent Document 1, a magnetic field is transmitted to the outside of a vehicle such that the range thereof is centered at a gap between a door and a center pillar of the vehicle when a first coil alone transmits radio waves. When a second coil independently transmits radio waves, a magnetic field is transmitted to the outside of the vehicle such that the magnetic field spreads toward the front and rear of the vehicle from the front seat windows and the rear seat windows while avoiding the center pillars. Combining the ranges of the magnetic fields transmitted from the first and second coils allows the range of the magnetic fields to cover the areas in front of the left-and-right-side doors of the vehicle, thereby ensuring the provision of outside-vehicle communication areas in front of the left-and-right-side doors of the vehicle.

Vehicle doors use different materials for the window glass portion and for the body portion, which have significantly different degrees of radio wave transmissivity. Because of this, the smart keyless entry system disclosed in Patent Document 1 has difficulty in accurately detecting signals due to unstable communication that may occur depending on the vertical position of a portable device near the doors. This problem becomes particularly noticeable when a portable device uses high-frequency radio waves. In such a case, there is a need to provide a large number of coils, which gives rise to the problem of an increased computational load.

Accordingly, there may be a need for a smart keyless entry system that accurately detects the location of a portable device regardless of the vertical position of the portable device. There may be a further need for a smart keyless entry system that prevents an increase in the computational load without using a complex configuration even when the portable device uses high-frequency radio waves to communicate with an on-vehicle apparatus. [Patent Document 1] Japanese Patent Application Publication No. 2011-208449

SUMMARY OF THE INVENTION

According to an embodiment, a smart keyless entry system having an on-vehicle apparatus installed in a vehicle and a portable device configured to communicate with the on-vehicle apparatus includes a location calculating unit configured to calculate a location of the portable device through communication between the on-vehicle apparatus and the portable device, and a vertical-position calculating unit configured to calculate a vertical position of the portable device, wherein the on-vehicle apparatus and the portable device communicate with each other under conditions adjusted in response to the calculated vertical position of the portable device, and wherein control is performed based on the calculated location of the portable device.

According to at least one embodiment, reception sensitivity for communication between the portable device and the on-vehicle apparatus may be adjusted in response to the transmissivity of radio waves, which varies depending on the vertical position of the portable device. This arrangement enables reliable reception of radio waves regardless of changes in radio wave transmissivity, thereby allowing the position of the portable device to be accurately detected.

According to at least one embodiment, the location of the portable device is accurately detected regardless of the vertical position of the portable device, and an increase in the computational load is prevented without using a complex configuration even when the portable device uses high-frequency radio waves to communicate with the on-vehicle apparatus.

BRIEF DESCRIPTION OF THE DRAWINGS

Other objects and further features of the present invention will be apparent from the following detailed description when read in conjunction with the accompanying drawings, in which:

FIG. 3 is a flowchart illustrating the process of determining a vertical position in the smart keyless entry system according to the embodiment.

DESCRIPTION OF THE PREFERRED EMBODIMENTS

In the following, a description will be given of a smart keyless entry system according to embodiments by referring to the accompanying drawings.

Figure 1:
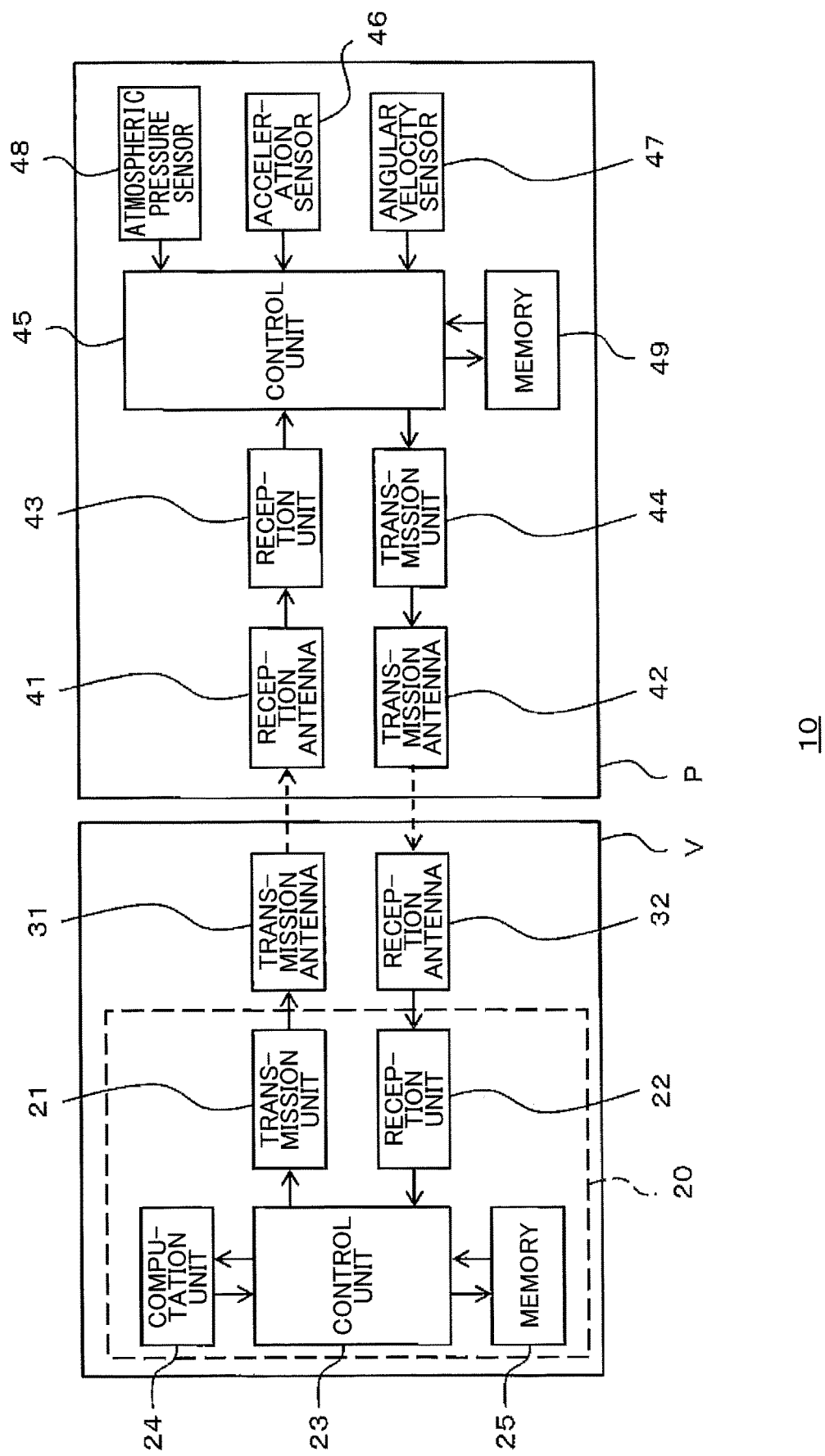
FIG. 1 is a block diagram illustrating the configuration of a smart keyless entry system according to an embodiment.

FIG. 1 is a block diagram illustrating the configuration of a smart keyless entry system 10 according to an embodiment. As illustrated in FIG. 1, the smart keyless entry system 10 includes a portable device P and an on-vehicle apparatus V installed in the vehicle. The on-vehicle apparatus V and the portable device P wirelessly communicate with each other. The on-vehicle apparatus V performs predetermined control of the vehicle such as locking and unlocking of the doors based on the location of the portable device P.

As illustrated in FIG. 1, the on-vehicle apparatus V includes an electronic control unit 20 disposed in a dashboard or the like of the vehicle, a transmission antenna 31, and a reception antenna 32. The electronic control unit 20 includes an on-vehicle transmission unit 21, an on-vehicle reception unit 22, an on-vehicle control unit 23, a computation unit 24, and a memory 25.

The portable device P, which may be a smartphone, includes a reception antenna 41, a transmission antenna 42, a portable-device reception unit 43, a portable-device transmission unit 44, a portable-device control unit 45, an acceleration sensor 46, an angular velocity sensor 47, an atmospheric pressure sensor 48, and a memory 49 as illustrated in FIG. 1.

The on-vehicle transmission unit 21 supplies signals from the on-vehicle control unit 23 to the transmission antenna 31. The transmission antenna 31 transmits the signals to the portable device P. The reception antenna 41 of the portable device P receives the signals, which are then sent to the portable-device reception unit 43.

The portable-device transmission unit 44 supplies signals from the portable-device control unit 45 to the transmission antenna 42. The transmission antenna 42 transmits these signals to the on-vehicle apparatus V. The reception antenna 32 of the on-vehicle apparatus V receives the signals, which are then sent to the on-vehicle reception unit 22.

In the case of the portable device P being a smartphone, communication between the on-vehicle apparatus V and the portable device P is carried out by using radio-frequency (RF) waves.

Signals transmitted from the portable device P to the on-vehicle apparatus V include data detected by the acceleration sensor 46, the angular velocity sensor 47, and the atmospheric pressure sensor 48. The data detected by the acceleration sensor 46, the angular velocity sensor 47, and the atmospheric pressure sensor 48 are stored in the memory 49 of the portable device P.

The acceleration sensor 46, which detects a force generated when a mass moves in the direction of acceleration, may include a beam for supporting the mass and a strain sensor for detecting the deformation of the beam. The amount of deformation detected by the strain sensor is proportional to the applied force. There are three sensor units, each of which includes a mass, a beam, and a strain sensor. The direction in which the beam deforms is oriented in a corresponding one of the three axes such that the three sensor units detect accelerations in the three axial directions orthogonal to each other, which correspond to the X-Y-Z coordinate axes.

The angular velocity sensor 47, which may be a vibrating structure gyroscope, detects an angular velocity based on the mass of a vibrating structure, the speed of the vibrating structure, and the Coriolis force. The acceleration sensor 46 and the angular velocity sensor 47 are implemented as MEMS devices. Data detected by the acceleration sensor 46 and the angular velocity sensor 47 are supplied to the computation unit 24 through the on-vehicle control unit 23. The location of the portable device P is calculated based on the detected data. Based on this calculated location, the on-vehicle control unit 23 serving as an in/out determination unit determines whether a person carrying the portable device P is inside the vehicle or outside the vehicle. The on-vehicle control unit utilizes the location calculated by the computation unit 24 and the determination made by the on-vehicle control unit 23 as well as a computation-purpose table stored in the memory 25 in advance to generate command signals for performing predetermined control of the vehicle such as locking or unlocking of the doors. These command signals are supplied to the control objects.

The atmospheric pressure sensor 48 detects atmospheric pressure at the location where the portable device P is situated. The detected pressure is transmitted to the on-vehicle apparatus V, and is then supplied to the computation unit 24 through the on-vehicle control unit 23. Having received the detected data, the computation unit 24 serving as a vertical-position computation unit calculates the vertical position of the portable device P based on the data detected by the atmospheric pressure sensor 48, i.e., the atmospheric pressure at the location of the portable device P, by referring to a conversion table between atmospheric pressures and vertical positions stored in the memory 25 in advance. The calculated vertical position is registered in the memory 25. The vertical position may indicate the height from the ground, the height from the bottom face of the vehicle body, or the height from the boundary between the window glass and the body of a door. The height from the bottom face of the body is obtained by calculating a difference between the height of the portable device P from the ground and the height of the bottom face of the vehicle from the ground, which is stored in the memory 25 in advance. The height from the boundary between the window glass and the body of a door is obtained by calculating a difference between the height of the portable device P from the ground and the height of such a boundary from the ground, which is stored in the memory 25 in advance.

The computation unit 24 also serves as a communication environment estimating unit to estimate the communication environment of the portable device P based on the calculated vertical position. The estimated communication environment is registered in the memory 25. This communication environment corresponds to the transmissivity of radio waves exchanged between the on-vehicle apparatus V and the portable device P. The memory 25 of the on-vehicle apparatus V stores, among other things, information about the vertical position of the glass of the doors. The computation unit 24 compares the vertical position of glass stored in the memory 25 with the vertical position of the portable device P calculated by serving as the vertical-position computation unit. In the case of the portable device P being situated within the vertical position range of the glass, the computation unit 24 estimates that the transmissivity of radio waves is greater than or equal to a predetermined value in the current communication environment. In the case of the portable device P being situated outside the vertical position range of the glass, the computation unit 24 estimates that the transmissivity of radio waves is less than the predetermined value in the current communication environment because the portable device P is situated at the height corresponding to the vertical position of the metal body.

The estimated results obtained by the communication environment estimating unit are supplied to the on-vehicle control unit 23. Based on the results of estimating the communication environment, the on-vehicle control unit 23 serving as a threshold-value controlling unit changes the threshold for determining the received signal strength indicator (RSSI) of a signal supplied from the on-vehicle reception unit 22. This determination threshold is sent to the computation unit 24. The computation unit 24 subtracts the determination threshold from the received signal supplied from the on-vehicle reception unit 22, followed by calculating the location of the portable device P based on the result of subtraction.

As for a change in the determination threshold, the on-vehicle control unit 23 sets the determination threshold to a first value when the transmissivity of radio waves is greater than or equal to the predetermined value in the current communication environment. The on-vehicle control unit 23 sets the determination threshold to a second value smaller than the first value when the transmissivity of radio waves is less than the predetermined value in the current communication environment. The determination threshold is changed according to the communication environment in this manner, which allows the location of the portable device P to be accurately derived regardless of a difference in the transmissivity of radio waves caused by a difference in the vertical position of the portable device P. This arrangement is particularly effective when the strength of reception significantly varies depending on differences in the communication environment due to the use of high-frequency radio waves for communication as in the case of the portable device P being a smartphone.

The on-vehicle control unit 23 changes the threshold for determining the received signal strength indicator of a signal supplied from the on-vehicle reception unit 22 based on the results of determination made by serving as the in/out determination unit. This determination threshold is sent to the computation unit 24. The computation unit 24 subtracts the determination threshold from the received signal supplied from the on-vehicle reception unit 22, followed by serving as a location calculating unit to calculate the location of the portable device P based on the result of subtraction, and then performing computations such as to obtain the vertical position of the portable device P and to estimate the communication environment. The on-vehicle control unit 23 sets the determination threshold to a third value upon determining that the person carrying the portable device is inside the vehicle according to the determination made by serving as the in/out determination unit. The on-vehicle control unit 23 sets the determination threshold to a fourth value smaller than the third value upon determining that the person carrying the portable device is outside the vehicle.

Combining a change in the determination threshold according to the results of communication environment estimation and a change in the determination threshold according to the results of determination made as the in/out determination unit is preferable because of a resulting increase in the accuracy of location detection for the portable device P.

Figure 2:
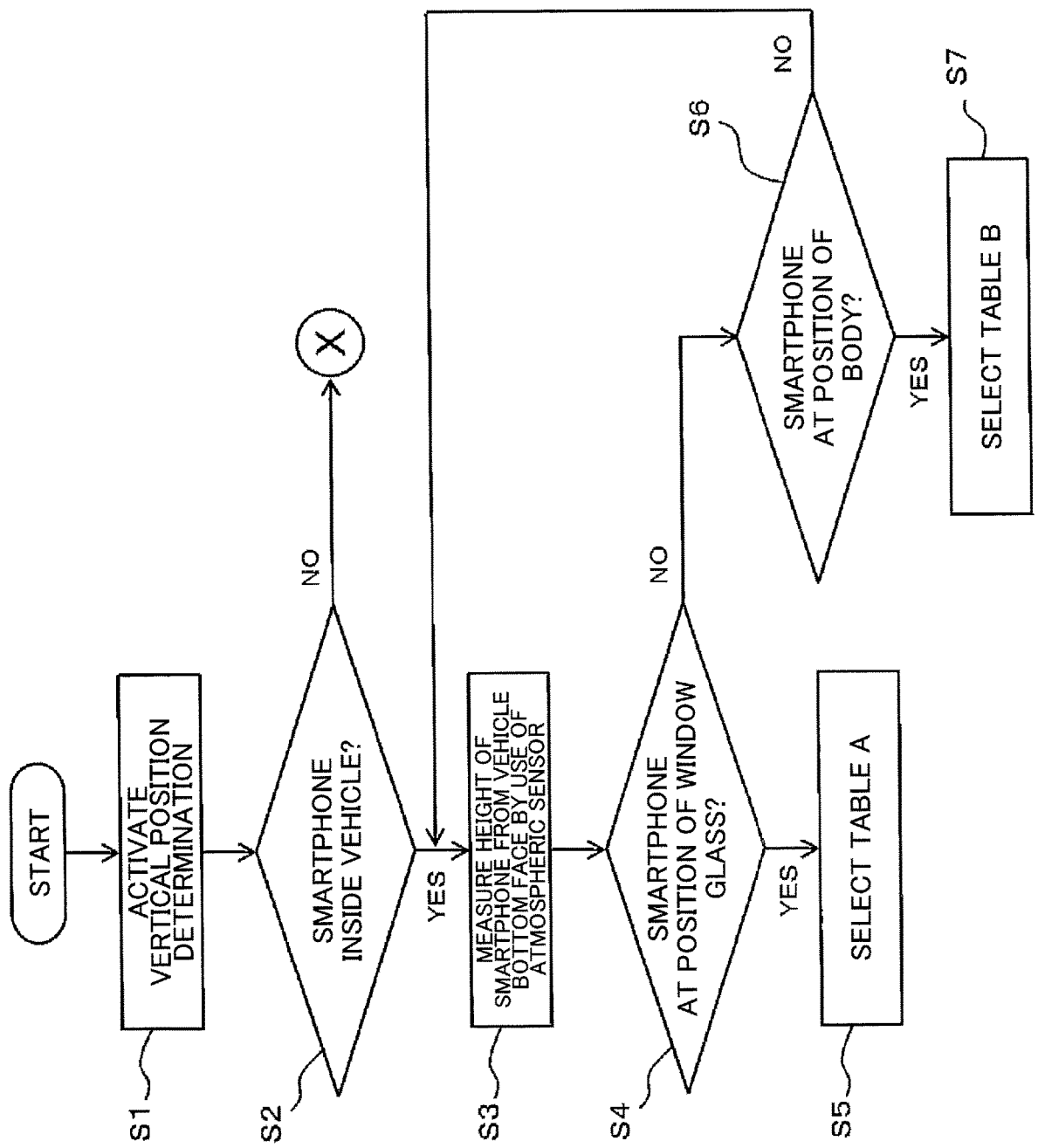
FIG. 2 is a flowchart illustrating the process of determining a vertical position in the smart keyless entry system according to the embodiment.

In the following, a description will be given of an example of the process of determining a vertical position in the smart keyless entry system 10 of the present embodiment by referring to FIG. 2 and FIG. 3. FIG. 2 and FIG. 3 are flowcharts illustrating the process of determining a vertical position in the smart keyless entry system 10. The connection symbol X in FIG. 2 and the connection symbol X in FIG. 3 correspond to each other, so that the procedure proceeds to step S8 of FIG. 3 in the case of "NO" in step S2 of FIG. 2. In this example, the portable device P is a smartphone that uses high-frequency radio waves to communicate with the on-vehicle apparatus V. In FIG. 2 and FIG. 3, the portable device P is referred to as a "smartphone".

The on-vehicle apparatus V and a smart keyless entry application in the portable device P are activated to start a program for determining a vertical position (step S1). In response, data detected by the acceleration sensor 46, the angular velocity sensor 47, and the atmospheric pressure sensor 48 are transmitted from the portable device P to the on-vehicle apparatus V. The on-vehicle control unit 23 serves as the in/out determination unit to determine whether the portable device P is situated inside the vehicle or outside the vehicle (step S2).

Upon determining that the portable device P is inside the vehicle (YES in step S2), the computation unit 24 subtracts the height of the bottom face of the vehicle body stored in the memory in advance from the vertical position of the portable device P calculated based on the data detected by the atmospheric pressure sensor 48, thereby calculating the height of the portable device P (i.e., smartphone) from the vehicle bottom face (step S3). It may be noted that data specific to the vehicle, such as the height of the bottom face of the vehicle body and the ranges of vertical positions of the door glass and the door body, are stored in the memory 25 in advance at the time of installing the on-vehicle apparatus V in the vehicle.

The computation unit 24 then serves as the communication environment estimating unit to estimate the communication environment of the portable device P based on the height calculated in step S3, i.e., to determine whether the portable device P is at the height corresponding to the vertical position of the window glass of the vehicle doors (step S4). When this determination indicates that the portable device P is at the height corresponding to the vertical position of the window glass (YES in step S4), a table A is selected as a table regarding a determination threshold for received signal strength (step S5). The table A is thereafter used to calculate the location of the portable device P.

The "table regarding a determination threshold for received signal strength" stores received signal strength values together with associated values, which are obtained by subtracting, from the respective received signal strength values, a determination threshold selected according to the communication environment. A plurality of different tables are stored in the memory 25 in advance for respective determination thresholds.

When the portable device P is not at the height corresponding to the vertical position of the window glass (No in step S4), determination is made as to whether the portable device P is at the height corresponding to the vertical position of the vehicle body based on the height calculated in step S3 (step S6). When this determination indicates that the portable device P is at the height corresponding to the vertical position of the body (YES in step S6), a table B is selected as a table regarding a determination threshold for received signal strength (step S7). The table B is thereafter used to calculate the location of the portable device P. The determination threshold corresponding to the table B is smaller than the determination threshold corresponding to the table A (used in step S5).

When the determination in step S6 indicates that the portable device P is not at the height corresponding to the vertical position of the vehicle body (NO in step S6), the processes in step S3 and in the subsequent steps described above will be performed again.

When the in/out determination made in step S2 indicates that the portable device P is outside the vehicle (NO in step S2, step S8), the computation unit 24 subtracts the height of the bottom face of the vehicle body stored in the memory in advance from the vertical position of the portable device P calculated based on the data detected by the atmospheric pressure sensor 48, thereby calculating the height of the portable device P from the vehicle bottom face (step S9).

The computation unit 24 then serves as the communication environment estimating unit to estimate the communication environment of the portable device P based on the height calculated in step S9, i.e., to determine whether the portable device P is at the height corresponding to the vertical position of the window glass of the vehicle doors (step S10). When this determination indicates that the portable device P is at the height corresponding to the vertical position of the window glass (YES in step S10), a table C is selected as a table regarding a determination threshold for received signal strength (step S11). The table C is thereafter used to calculate the location of the portable device P.

When the portable device P is not at the height corresponding to the vertical position of the window glass (No in step S10), determination is made as to whether the portable device P is at the height corresponding to the vertical position of the vehicle body based on the height calculated in step S9 (step S12). When this determination indicates that the portable device P is at the height corresponding to the vertical position of the body (YES in step S12), a table D is selected as a table regarding a determination threshold for received signal strength (step S13). The table D is thereafter used to calculate the location of the portable device P. The determination threshold corresponding to the table D is smaller than the determination threshold corresponding to the table C (used in step S11). Further, the determination threshold corresponding to the table C is smaller than the determination threshold corresponding to the table A, and the determination threshold corresponding to the table D is smaller than the determination threshold corresponding to the table B.

When the determination in step S12 indicates that the portable device P is not at the height corresponding to the vertical position of the vehicle body (NO in step S12), e.g., when the portable device P is situated below the vehicle bottom face or above the vehicle rooftop, the processes in step S9 and in the subsequent steps described above will be performed again.

In the following, variations will be described.

In the embodiment described above, the computation unit 24 of the on-vehicle apparatus V performs the functions of the vertical-position computation unit, the communication environment estimating unit, and the location calculating unit. All or part of these functions may alternatively be performed by the portable device P.

An atmospheric pressure sensor may also be provided in the on-vehicle apparatus V in addition to the one in the portable device P. In such an arrangement, the computation unit 24 serving as the vertical-position calculating unit calculates the vertical position of the portable device P based on a difference between data detected by the atmospheric pressure sensor of the on-vehicle apparatus V and data detected by the atmospheric pressure sensor 48 of the portable device P. This arrangement allows the relative vertical position between the on-vehicle apparatus V and the portable device P to be obtained, which enables more accurate estimation of the communication environment as well as more accurate detection of the vertical position of the portable device P.

In the embodiment described above, the determination threshold for the received signal strength indicator is changed according to the results of communication environment estimation. The strength of transmitted radio waves between the on-vehicle apparatus V and the portable device P may also be changed. For example, transmission strength may be increased for the communication environment in which the transmissivity of radio waves is low as in the case of a door body, and may be decreased for the communication environment in which the transmissivity is high. This arrangement allows signals to be received in a stable manner regardless of the transmissivity of radio waves, which increases the accuracy of location detection with respect to the portable device P.

A plurality of transmission antennas and a plurality of reception antennas may be provided at respective different heights in the vehicle, and the antennas to be used may be changed according to the results of communication environment estimation. For example, antennas that are at the position with relatively high transmissivity of radio waves may be selected for the communication environment in which the transmissivity of radio waves is low, thereby effectively increasing transmission strength. This arrangement improves the stability of signals.

A plurality of radio wave frequencies for communication between the on-vehicle apparatus V and the portable device P may be prepared. Selecting a frequency with relatively high transmissivity according to the communication environment may improve the stability of signals.

The embodiment with the configurations described above provides the following advantages.

(1) Obtaining the vertical position of the portable device P by use of the atmospheric pressure sensor enables the estimation of communication environment with respect to the portable device P. In response to this communication environment, the received signal strength for communication between the on-vehicle apparatus V and the portable device P is adjusted, thereby enabling accurate detection of the location of the portable device P regardless of the vertical position of the portable device P. An increase in the computational load is prevented without using a complex configuration even when the portable device P uses high-frequency radio waves to communicate with the on-vehicle apparatus V. When the communication environment stays the same for more than a predetermined period such as three seconds, it may be estimated that the person carrying the portable device P is holding a fixed posture. This allows a determination to be made as to whether the person is sitting or standing depending on the height of the portable device P.

(2) The on-vehicle control unit 23 serving as a threshold controlling unit changes the determination threshold in response to the estimated communication environment. This arrangement allows signals to be received in a stable manner regardless of the transmissivity of radio waves, which increases the accuracy of location detection with respect to the portable device P. Further, even a signal having low strength can be properly received in the communication environment in which the transmissivity of radio waves is low, and signals having more than a predetermined level of strength can be received in the communication environment in which the transmissivity of radio waves is high, which reduces the effect of reflective waves and noises.

(3) Based on the determination made by the on-vehicle control unit 23 serving as the in/out determination unit, the determination threshold for the receive signal strength is changed, so that the determination threshold can be set at different levels depending on the communication environment and the in/out determination, which enables more accurate location detection. Further, even a signal having low strength can be properly detected outside the vehicle, and the effect of noises and reflective waves from the body may be reduced inside the vehicle where radio waves are strong.

Although the present invention has been described by referring to the embodiments, the present invention is not limited to these embodiments, and variations and modifications may be made without departing from the scope of the present invention or for the purpose of improvement.

What is claimed is:

1. A smart keyless entry system having an on-vehicle apparatus installed in a vehicle and a portable device configured to communicate with the on-vehicle apparatus, comprising:
    a location calculating unit configured to calculate a location of the portable device through communication between the on-vehicle apparatus and the portable device; and
    a vertical-position calculating unit configured to calculate a vertical position of the portable device; and a communication environment estimating unit configured to make a comparison between a vertical position of a window glass and the calculated vertical position of the portable device, wherein the on-vehicle apparatus and the portable device communicate with each other under conditions adjusted in response to a result of the comparison, and wherein control is performed based on the calculated location of the portable device.

2. The smart keyless entry system as claimed in claim 1, wherein the portable device includes an atmospheric sensor configured to detect atmospheric pressure, and the vertical-position calculating unit calculates the vertical position of the portable device based on data detected by the atmospheric sensor.

3. The smart keyless entry system as claimed in claim 1, further comprising a threshold controlling unit configured to change a determination threshold for received signal strength based on the result of the comparison.

4. The smart keyless entry system as claimed in claim 3, wherein the threshold controlling unit sets the determination threshold to a first value for a communication environment in which the portable device is situated within a range of the vertical position of the window glass, and sets the determination threshold to a second value smaller than the first value for a communication environment in which the portable device is situated outside the range of the vertical position of the window glass, according to the comparison made by the communication environment estimating unit.

5. The smart keyless entry system as claimed in claim 3, further comprising an in/out determination unit configured to make a determination as to whether a person carrying the portable device is inside the vehicle or outside the vehicle, wherein the threshold controlling unit changes the determination threshold for received signal strength based on a result of the determination made by the in/out determination unit.

6. The smart keyless entry system as claimed in claim 5, wherein the threshold controlling unit sets the determination threshold to a third value upon the in/out determination unit determining that the person carrying the portable device is inside the vehicle, and sets the determination threshold to a fourth value smaller than the third value upon the in/out determination unit determining that the person carrying the portable device is outside the vehicle.

7. The smart keyless entry system as claimed in claim 2, wherein the on-vehicle apparatus includes an on-vehicle atmospheric sensor configured to detect atmospheric pressure, and the vertical-position calculating unit calculates the vertical position of the portable device based on a difference between data detected by the on-vehicle atmospheric sensor and data detected by the atmospheric sensor of the portable device.

* * * * *